(12) United States Patent
Park

(10) Patent No.: US 9,403,648 B2
(45) Date of Patent: Aug. 2, 2016

(54) ELECTRIC DEVICE FOR LIFTING MOVING SIDEWALK FOR VEHICLE

(71) Applicant: Young Chan Park, Hanam-si (KR)

(72) Inventor: Young Chan Park, Hanam-si (KR)

( * ) Notice: Subject to any disclaimer, the term of this patent is extended or adjusted under 35 U.S.C. 154(b) by 103 days.

(21) Appl. No.: 14/470,945

(22) Filed: Aug. 28, 2014

(65) Prior Publication Data

US 2015/0063962 A1    Mar. 5, 2015

(30) Foreign Application Priority Data

Aug. 30, 2013   (KR) .................. 10-2013-0104347
Aug. 25, 2014   (KR) .................. 10-2014-0110761

(51) Int. Cl.
| | | |
|---|---|---|
| B65G 65/00 | (2006.01) | |
| B65G 67/08 | (2006.01) | |
| B65G 17/00 | (2006.01) | |
| B60R 9/00 | (2006.01) | |

(52) U.S. Cl.
CPC . *B65G 67/08* (2013.01); *B60R 9/00* (2013.01); *B65G 17/005* (2013.01)

(58) Field of Classification Search
CPC ..................................................... B65G 65/00

USPC ............... 198/318, 341.01, 341.08, 343.2
See application file for complete search history.

(56) References Cited

U.S. PATENT DOCUMENTS

| | | | | |
|---|---|---|---|---|
| 4,624,357 | A  * | 11/1986 | Oury ...................... | E04G 21/04 198/313 |
| 5,360,097 | A  * | 11/1994 | Hibbs .................. | B65G 41/005 198/313 |
| 8,033,775 | B2 * | 10/2011 | Donelson ................. | B60P 1/38 198/312 |

* cited by examiner

*Primary Examiner* — Gene Crawford
*Assistant Examiner* — Lester Rushin
(74) *Attorney, Agent, or Firm* — Revolution IP, PLLC

(57) ABSTRACT

Disclosed is an electric device for lifting a moving sidewalk for a vehicle which comprises a rubber belt that is installed on a roof of a drivable vehicle body; a moving sidewalk that has one end coupled to an edge of one side of the rubber belt, wherein the moving sidewalk extends to form a chain rail from the rubber belt toward the ground, and is folded at the time of non-use; a moving sidewalk lift that is configured to load a luggage thereon; a driving unit that is configured to provide a driving force for movement of the moving sidewalk lift; and a moving sidewalk robot that is configured to allow a saw-toothed wheel provided on the moving sidewalk lift to be horizontally balanced in an automatic manner while the saw-toothed wheel is moving along the chain rail 400 upon the rotation of the rubber belt.

5 Claims, 5 Drawing Sheets

ELECTRIC DEVICE FOR LIFTING MOVING SIDEWALK FOR VEHICLE

CROSS-REFERENCE TO RELATED APPLICATIONS

This application claims priority from Korean Patent Applications Nos. 10-2013-0104347, filed on Aug. 30, 2013 and 10-2014-0110761, filed on Aug. 25, 2014, in the Korean Intellectual Property Office, the disclosure of which is incorporated herein by reference in its entirety.

BACKGROUND OF THE INVENTION

1. Field of the Invention

The present disclosure relates to an electric device for lifting a moving sidewalk for a vehicle, and more particularly, to an electric device for lifting a moving sidewalk for a vehicle, which is capable of electrically extending only upon loading and allowing for an automatic lifting and loading, in loading and fixing leisure equipment onto a roof rack of the vehicle, and of being kept at one side of the vehicle in a folded state at the time of non-use.

2. Description of the Related Art

An increase in leisure activities is attributing to a great increase in transportation of leisure equipment using vehicles. Reflecting such trend, the use of multi-purpose vehicles, such as Sports Utility Vehicles (SUVs), and vehicles facilitating transportation of leisure equipment is greatly increasing in recent time. For the conventional vehicles, assistive devices which are mounted to the vehicles for carrying the leisure equipment are increasingly developed and used.

Specifically, some of leisure equipment, such as a surfing board, a bicycle and an auto camping outfit, which are difficult to be loaded in a vehicle, are fixed to a roof of the vehicle using a roof rack and a fixing tool installed at the roof rack, or fixed and carried using a separate device which is attached to a rear surface of the vehicle.

However, among those devices or tools, a device using the roof rack has a problem that great and heavy leisure equipment should be lifted onto the roof of the vehicle by a user's own force and fixed to the roof rack and the fixing tool of the roof rack.

The conventional device using the roof rack requires for a user's manual operation for loading such large, heavy equipment, or causes damage on the vehicle during the loading.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

In view of the foregoing problems, there is provided a device for lifting a moving sidewalk for a vehicle, capable of electrically extending only upon loading and allowing for an automatic lifting and loading, in loading and fixing leisure equipment onto a rubber belt of a moving sidewalk for a vehicle, and of being kept at one side of the vehicle in a folded state at the time of non-use.

In order to achieve the objects described above, there is provided an electric device for lifting a moving sidewalk for a vehicle, the device including a rubber belt that is installed on a roof of a drivable vehicle body, and forms an endless track, a moving sidewalk that has one end coupled to an edge of one side of the rubber belt, extends to form a chain rail from the rubber belt toward the ground, and is folded at the time of non-use, a moving sidewalk lift that is configured to load a luggage thereon, and allow the luggage to be fixed to an upper portion of the rubber belt by being moved along the rubber belt and the moving sidewalk in one direction, a driving unit that is configured to provide a driving force for movement of the moving sidewalk lift, and a moving sidewalk robot that is configured to allow a saw-toothed wheel provided on the moving sidewalk lift to be horizontally balanced in an automatic manner while the saw-toothed wheel is moving along the chain rail upon the rotation of the rubber belt.

The driving unit may be provided with a cable that is coupled to a frame of the saw-toothed wheel, and a motor that is configured to provide power for rotation of the rubber belt through the cable.

EFFECT OF THE INVENTION

An electric device for lifting a moving sidewalk for a vehicle may be allowed to electrically extend only upon loading and allow for an automatic lifting and loading, in loading and fixing leisure equipment onto a lift fixedly provided at an upper portion of a rubber belt of a moving sidewalk for a vehicle. Also, the electric device for listing the moving sidewalk for the vehicle may be kept at one side of the vehicle in a folded state at the time of non-use, thereby enabling a user to load and unload a luggage or the like in a fast and convenient manner.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
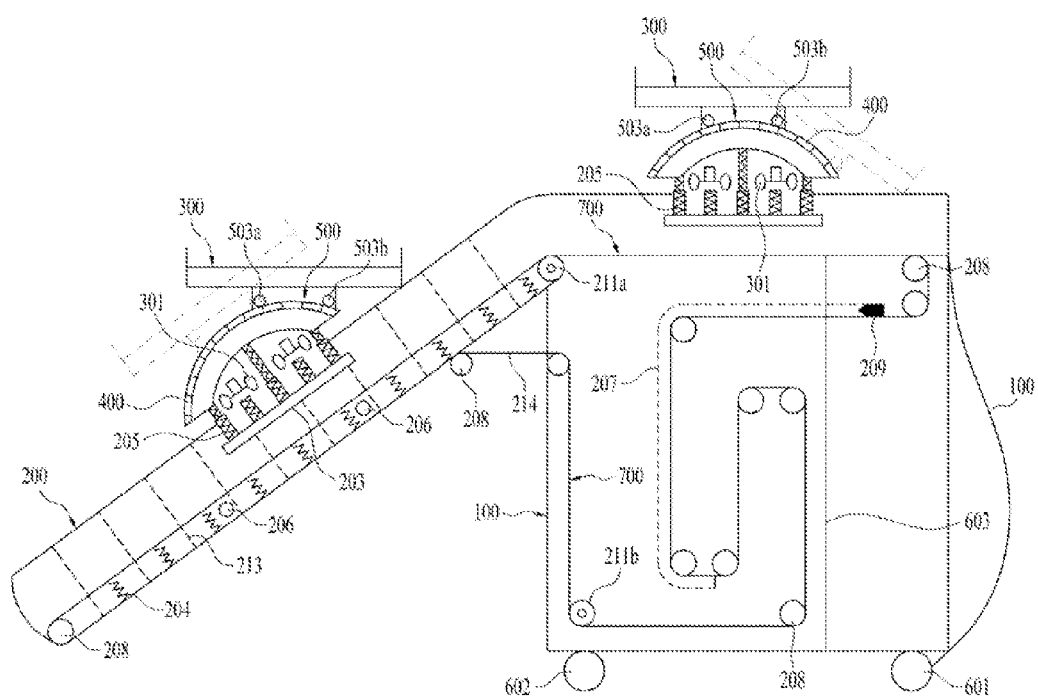
FIG. 1 is a schematic view illustrating a configuration of a moving sidewalk lifting device in accordance with the preferred exemplary embodiment disclosed herein.

Certain exemplary embodiments of the present invention will now be described in greater detail with reference to the accompanying drawings, so as to be practiced by those skilled in the art. In the following description, same drawing reference numerals are used for the same elements even in different drawings. Also, well-known functions or constructions are not described in detail since they would obscure the invention with unnecessary detail. Several features disclosed herein are extended, reduced or simplified for the sake of explanation, and the drawings and components illustrated therein may not be illustrated at an appropriate rate. However, those details would be easily understood by those skilled in the art.

Referring to FIGS. 1 to 5, an electric device for lifting a moving sidewalk for a vehicle according to the preferred embodiment disclosed herein includes a rubber belt 700 that is installed on a roof of a drivable vehicle 100 and configured to form an endless track, a moving sidewalk 200 that has one end coupled to an edge of one side of the rubber belt 700, extends to form a rail along a direction from the rubber belt 700 to the ground, and is folded at the time of non-use, a moving sidewalk lift 300 that is configured to load an object (or luggage, etc.) thereon, and allow the luggage to be fixed to an upper portion of the rubber belt 700 by being moved along the rubber belt 700 and the moving sidewalk 200 in one direction, a driving unit that is configured to provide a driving force for moving the moving sidewalk lift 300, and a moving sidewalk robot 500 that is configured to allow a saw-toothed wheel 503 provided on the moving sidewalk lift 300 to be horizontally balanced in an automatic manner while the saw-toothed wheel 503 is moving along a chain rail 400 upon the rotation of the rubber belt 700.

Here, the driving unit is provided with a cable 210 that is coupled to a frame of the saw-toothed wheel 503, and a motor 211b that is configured to provide power for rotation of the rubber belt 700 through the cable 210.

The moving sidewalk (moving walkway or automatic board) 200, as illustrated in FIG. 1, is provided with a plurality of flat moving sidewalk footboards 203 engaged with one another in parallel. An installation angle of the moving sidewalk 200 may be adjusted in the range of 0° (horizontal type) to 35°.

A moving sidewalk plate 201 is implemented as a rubber belt having an endless track. The moving sidewalk plate 201 is provided on a lower surface thereof with a mattress 212 on which a plurality of compression springs 204 are installed in a longitudinal direction, and moving sidewalk panels 213 that horizontally cross the rubber belt 700. Here, the mattress is formed in a rectangular shape which is flat and even, and provided with a plurality of springs mounted therein.

The moving sidewalk lift 300 is provided with a basic set that a lift roller wheel 301, the chain rail 400, the moving sidewalk robot 500 and the lift saw-toothed wheels 503a and 503b are connected.

Here, the moving sidewalk lift 300 includes a rotation motor 211b that is configured to shift a direction, a pulley 208 and the moving sidewalk footboard 203 that allows the moving sidewalk lift 300 to move on the rubber belt 700, a locker arm 206 and a cable 210 of the moving sidewalk plate 201 that are coupled to a frame of the lift roller wheel 301, and a motor 211a that is configured to provide power for the rotation of the rubber belt 700 through the cable 210.

Here, moving sidewalk footboard grooves 202 are formed on an upper surface of the moving sidewalk 200 to prevent the moving sidewalk lift 300 from being slipped down from an inclined surface, which connects lower and upper surfaces of the vehicle body 100. The lift roller wheel 301 of the moving sidewalk lift 300 may be inserted into the moving sidewalk footboard grooves 202 such that the moving sidewalk lift 300 cannot be slipped down even it is located on the inclined surface. That is, the reason why the moving sidewalk lift 300 is not slipped down from the inclined surface of the moving sidewalk 200 does not result from the structure of the moving sidewalk 200 itself but from the coupled structure between the lift roller wheel 301 and the moving sidewalk footboard grooves 202.

A plurality of springs 205 are installed on the surface of the moving sidewalk footboard 203 in a longitudinal direction (from rear to front of a vehicle body) with maintaining a predetermined interval. This allows the moving sidewalk footboard 203 to fix the roller wheel 301 by itself, such that the moving sidewalk lift 300 cannot be slipped down from the moving sidewalk 200.

On the other hand, the roller wheel 301 is not provided with a permanent magnet. The moving sidewalk 200 is configured such that the rubber belt 700, both ends of which are connected to form the endless track, is rotated forward or backward by a pair of motors 211a and 211b.

For example, when the rubber belt 700 provided on the moving sidewalk 200 is rotated forward by the pair of motors 211a and 211b, the moving sidewalk lift 300 can move along the inclined surface in a direction from a bottom to a top. On the other hand, when the rubber belt 700 of the moving sidewalk 200 is rotated backward by the motors 211a and 211b, the moving sidewalk lift 300 can move along the inclined surface from the top to the bottom.

The pair of motors 211a and 211b is installed on upper and lower end portions of the moving sidewalk 200, respectively. A plurality of moving sidewalk panels 213 supporting an inclined path are installed on a middle portion of the moving sidewalk 200. Rubber or a steel plate surrounds an outer surface of the moving sidewalk 200. The plurality of compression springs 204 provided on the moving sidewalk plate 201 and the moving sidewalk panels 213 support the rubber belt 700 such that the rubber belt 700 cannot be expanded even though a luggage is loaded on the moving sidewalk lift 300. The moving sidewalk 200 is a mechanism having a conveyer belt structure forming an endless track. Since the moving sidewalk 200 is slowly moved on an inclined or flat place, a user can load the luggage or move with standing on the upper portion of the moving sidewalk lift 300. The moving sidewalk 200 is generally installed in both directions, like an escalator. However, the preferred embodiment of the present disclosure illustrates that it is installed in only one side direction, and the forward and backward movements of the moving sidewalk 200 are preferably carried out at the same speed.

Figure 2:
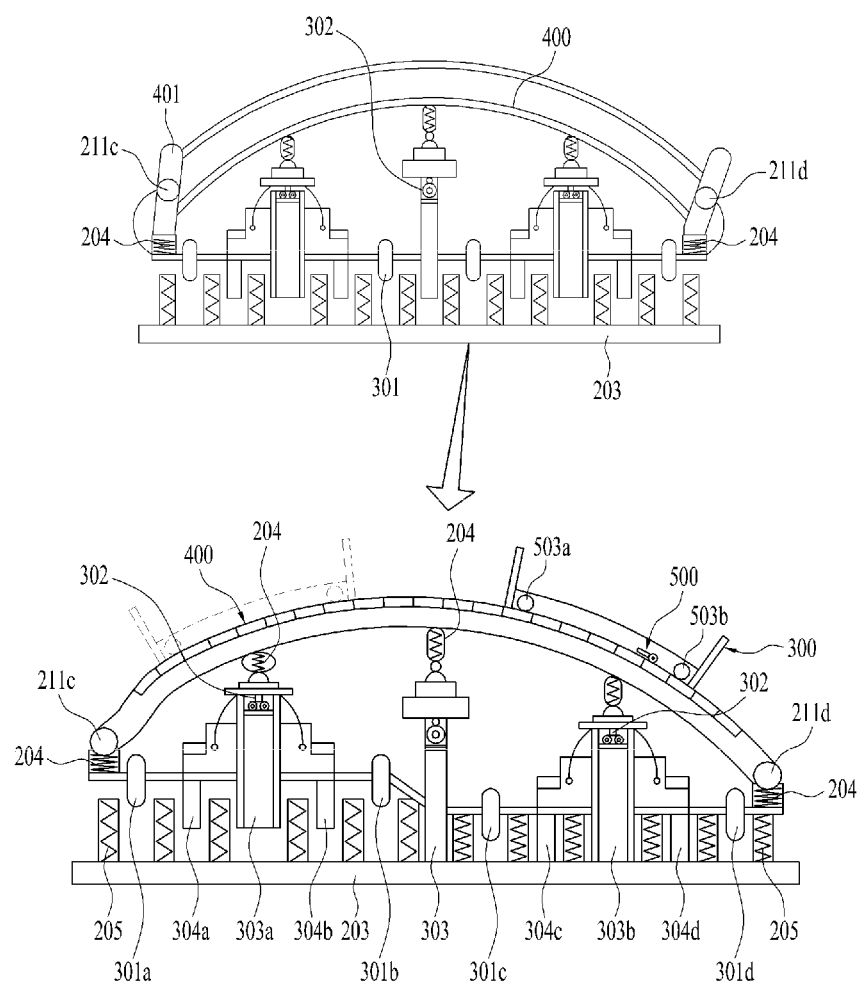
FIG. 2 is a view illustrating an operation of inserting lift roller wheels into moving sidewalk spring footboard grooves in accordance with the preferred embodiment disclosed herein.

Referring to FIG. 2, the lift roller wheel 301 is provided with a plurality of left and right outer plate rollers 304a, 304b, 304c and 304d that are provided on outer portions and allow upper portions of left and right outer plates to be moved, and thick fixing rollers 303a and 303b that are provided between two of the side rollers 304a and 304b and 304c and 304d, respectively.

When ordinarily moving on the ground, the roller wheel 301, as illustrated in FIG. 2, is moved by the fixing rollers 303, 303a and 303b, the wheels 301b and 301c which are located at a middle portion, and the left and right wheels 301a and 301d which are located at the outer portions. Then, when moving onto the moving sidewalk 200, the fixing rollers 303, 303a and 303b which are located at the central portion and the outer plate rollers 304a, 304b, 304c and 304d which are located at the outer portions may be inserted into the moving sidewalk footboard grooves 202 which have a concave-convex shape. Hence, when the fixing roller 303 is placed on the surface of the moving sidewalk footboard 203, the user can load the luggage on the moving sidewalk lift 300. Here, the springs 205 installed in the fixing rollers 303, 303a and 303b are driven by the moving sidewalk lift's own weight, to come in contact with stoppers 302 which are located on upper portions of the fixing rollers 303, 303a and 303b, thereby generating a stopping frictional force. Accordingly, the moving sidewalk lift 300 is stopped in the order of the left and right outer plate rollers 304a, 304b, 304c and 304d, and the fixing rollers 303, 303a and 303b.

Also, the stoppers 302 are further installed on the outer portions of the left and right outer plate rollers 304a, 304b, 304c and 304d and the fixing rollers 303a and 303b of the moving sidewalk lift 300, so as to further generate the stopping frictional force on the surface of the moving sidewalk footboard 203. That is, when the lift roller wheel 301 is inserted into the moving sidewalk footboard groove 202, a type of brake may operate to fix the lift roller wheel 301.

Here, explaining the lift roller wheel 301, since the lift roller wheel 301 is maintained in a fixed state in a linear form toward a longitudinal direction when meeting the moving sidewalk footboard grooves 202, as illustrated in FIG. 2, the lift roller wheel 301 is provided with a basic set, which is configured with the pair of small roller wheels 301b and 301c which are attached onto left and right sides of its center based on the fixing roller 303, the left and right outer plate rollers 304a, 304b, 304c and 034d which are located adjacent to the pair of small roller wheels 301b and 301c and move based on the pair of fixing rollers 303a and 303b, and the small roller wheels 301a and 301d which are attached to left and right outer sides of the outer plate rollers 304a and 304d.

Here, since the moving sidewalk lift 300 and the moving sidewalk 200 can be separated from each other, the left and right outer wheels 301a and 301d of the lift 300 and the middle wheels 301b and 301c are rolled on the ground, such that the moving sidewalk lift 300 moves out of the moving sidewalk 200.

Figure 3:
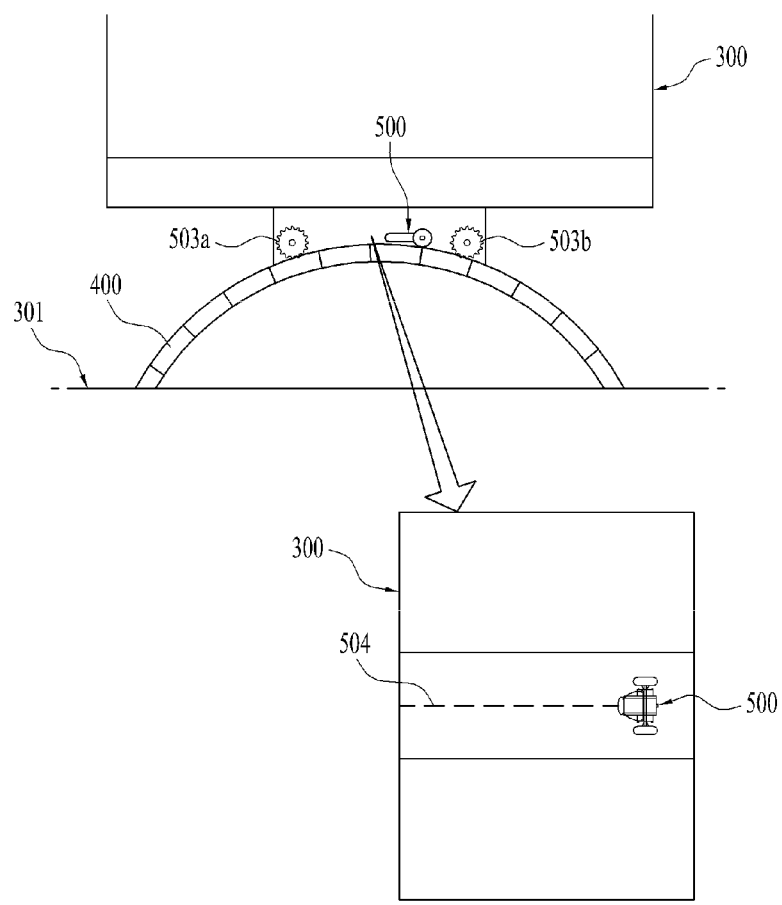
FIG. 3 is a view illustrating an operation of maintaining a horizontal balance of lift roller wheels on a chain rail in a manner of attaching a moving sidewalk robot onto an upper surface of a saw-toothed wheel of a lift in accordance with the preferred embodiment disclosed herein.

Referring to FIG. 3, the moving sidewalk robot 500 is attached onto a top of the saw-toothed wheel 503 of the lift. The chain rail 400 is fixed to the moving sidewalk lift 300 and an upper end portion of the roller wheel 301, thereby automatically controlling the lift saw-toothed wheel 503 moving along the chain rail 400 to be horizontally balanced. The moving sidewalk robot 500 includes a pair of saw-toothed wheels 503a and 503b that is balanced using the chain rail 400 in a direction from rear to front of the vehicle body 100, and a gyro sensor 501 that is configured to measure an inclination of the lift chain rail 400.

The lift saw-toothed wheel 503 is installed on an upper portion of the chain rail 400 to be movable therealong. The moving sidewalk robot 500, which allows for front and rear balances of the lift saw-toothed wheel 503, is connected based on the two saw-toothed wheels 503a and 503b. The moving sidewalk robot 500 includes a controller 505 that is configured to decide a forward or backward movement of the lift saw-toothed wheel 503 running along the upper end portion of the chain rail 400, and a pair of front and rear motors 211c and 211d.

When the lift saw-toothed wheel 503 is inclined forward, the lift saw-toothed wheel 503 which corresponds to the inclined angle is moved forward along the chain rail 400, such that the moving sidewalk lift 300 can be continuously balanced. On the other hand, when the lift saw-toothed wheel 503 is inclined backward, the lift saw-toothed wheel 503 which corresponds to the reversely inclined angle is moved backward along the chain rail 400, such that the moving sidewalk lift 300 can be continuously balanced.

Meanwhile, when the lift saw-toothed wheel 503 is located at a zero-point position, two wheels 502a and 502b of the moving sidewalk robot 500 may be balanced using the following method.

First, the moving sidewalk robot 500 may calculate a current angle of the lift saw-toothed wheel 503 using the gyro sensor 501, and compare the calculated current angle with a horizontal angle, so as to determine whether the lift saw-toothed wheel 503 is inclined forward or backward or horizontally balanced. The moving sidewalk robot 500 outputs a control signal corresponding to the forwardly inclined angle when the lift saw-toothed wheel 503 is inclined forward, and a control signal corresponding to the backwardly inclined angle when the lift saw-toothed wheel 503 is backwardly inclined.

The moving sidewalk robot 500 outputs a control signal corresponding to a travel value when the lift saw-toothed wheel 503 is maintained in a horizontal state, and checks an input signal of a line tracer sensor 504, which is installed adjacent to the chain rail 400, thereby determining a forward, backward or central moving direction of the lift saw-toothed wheel 503. Here, the line tracer sensor 504 may continuously sense a location of an object while the object moves.

The moving sidewalk robot 500 is provided with two wheels 502a and 502b. The moving sidewalk robot 500 controls the lift saw-toothed wheel 503 to slowly move forward or backward along the chain rail 400 in an automatic manner when the lift saw-toothed wheel 503 is about to being inclined forward or backward, using a balancing mechanism for deciding a moving direction and a moving speed by measuring a movement of the center of gravity.

There should be a reference sensor value for the lift saw-toothed wheel 503 to maintain its horizontal state. Hence, a user or an operator activates a zero-point button (not illustrated) provided on the lift saw-toothed wheel 503 while the lift saw-toothed wheel 503 is erected horizontal to a bottom surface at the beginning.

When the user or operator presses the zero-point button according to the status of the bottom (inclination, material, etc.), the gyro sensor 501 detects a rotation horizontal value of the lift saw-toothed wheel 503. The lift saw-toothed wheel 503 may be moved by shifting the center of gravity into a magnet or moved by changing an inclination sensing value. The lift saw-toothed wheel 503 may be kept balanced without being fallen down by determining an inclined state using the gyro sensor 501 and being self-controlled according to an inclined angle toward an inclined direction.

When the lift saw-toothed wheel 503 which maintains the balance by its own way is inclined to one side, the lift saw-toothed wheel 503 moves by itself in a direction to be balanced without being fallen down in a manner of repetitively moving forward or backward. The lift saw-toothed wheel 503 is designed by grafting the gyro sensor 501, which is a highly-effective up-to-date horizontal sensor, with a microcomputer and an automation technology using horizontal control software, an encoder for accurate motor control, etc. The lift saw-toothed wheel 503 has a horizontal control function by which the moving sidewalk lift 300 is always maintained in a horizontal state, and can control an operation and speed of the moving sidewalk lift 300 using a wireless joystick.

Figure 4:
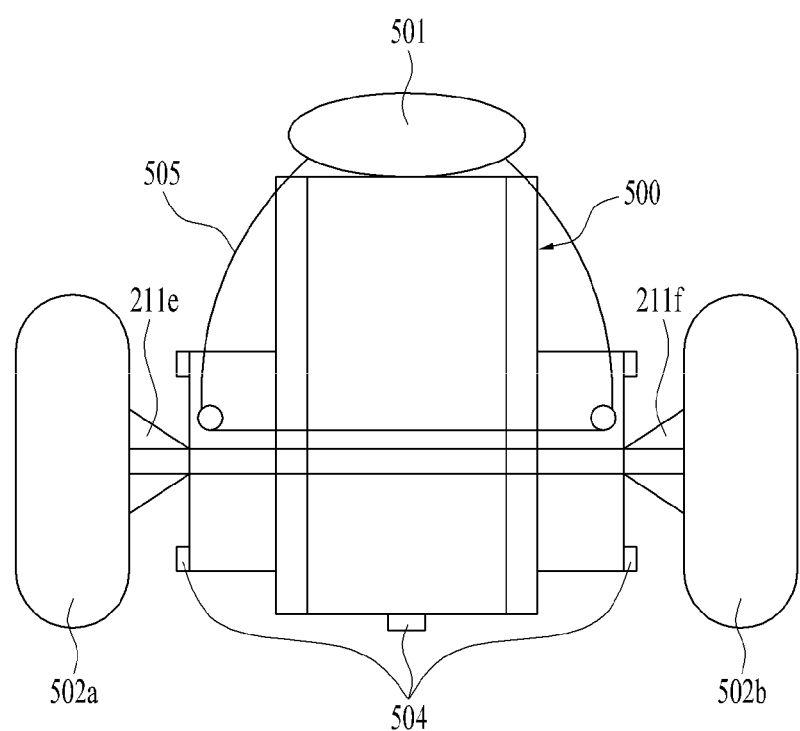
FIG. 4 is a view illustrating a structure of a moving sidewalk robot in accordance with the preferred embodiment disclosed herein.

As illustrated in FIG. 4, the moving sidewalk robot 500 includes left and right wheels 502a and 502b that are configured to balance the robot, a gyro sensor 501 that is configured to measure an inclination of the moving sidewalk robot 500, a line tracer sensor 504 that is configured to measure left and right location information relating to the moving sidewalk robot 500, a controller 505 that is configured to decide a forward or backward movement of the pair of wheels 502 based on the inclination information measured by the gyro sensor 501 and decide a forward or backward rotation of the moving sidewalk robot 500, and front and rear motors 211e and 211f that are configured to allow for forward and backward rotations of the wheel 502 of the moving sidewalk robot 500, respectively, according to a control signal of the controller 505.

Figure 5:
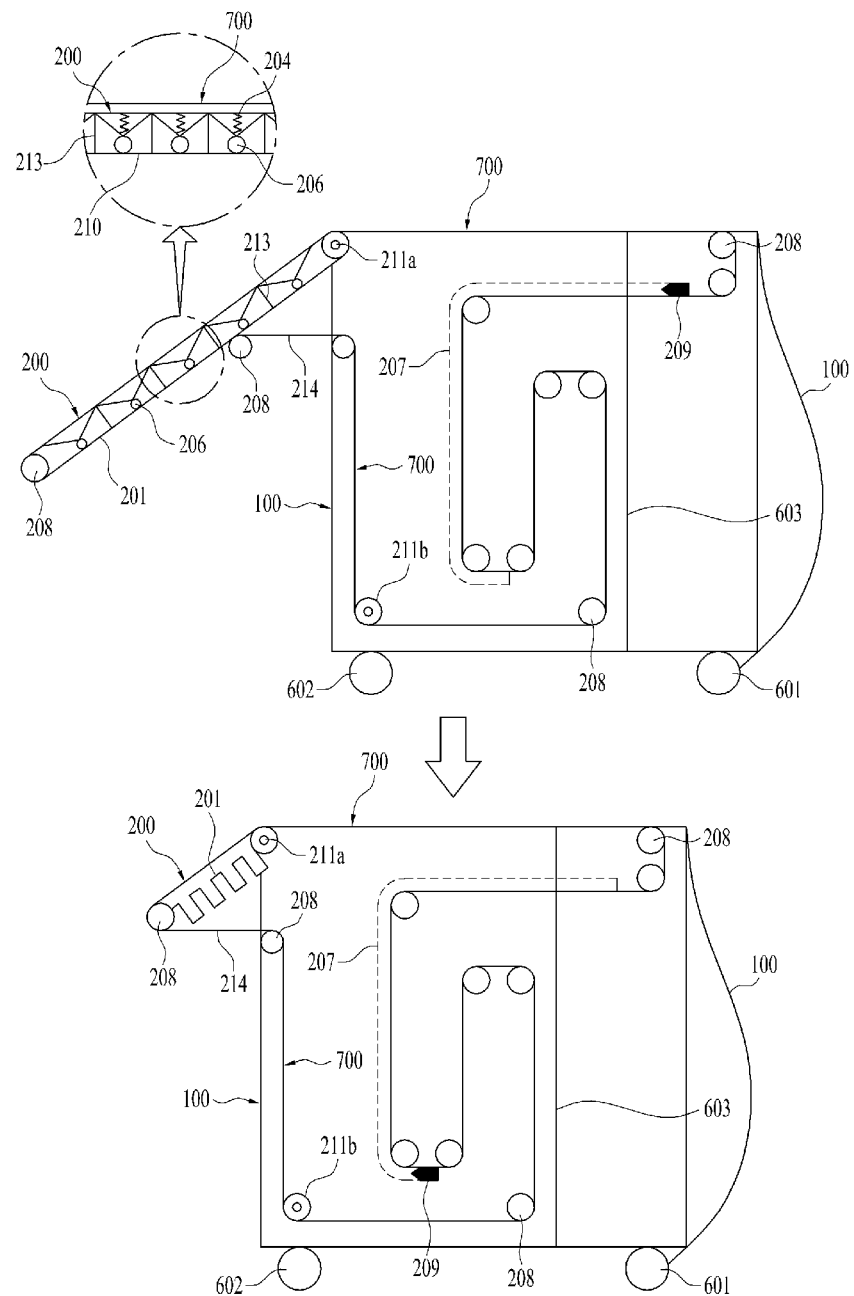
FIG. 5 is a view illustrating a state of keeping (storing, accommodating) a moving sidewalk and a lift in accordance with the preferred embodiment disclosed herein.

FIG. 5 is a view illustrating a state of keeping the moving sidewalk 200 and the moving sidewalk lift 300. As the cable 210 is rolled by the driving motors 211a and 211b which drive the moving sidewalk plate 201 located at the rear upper end of the vehicle body 100, the locker arms 206 connected to the moving sidewalk plate 201 are folded such that the moving sidewalk 200 is installed on an upper end portion of a moving sidewalk keeping rack 214. In a rotation-stopped state of the moving sidewalk rubber belt 700, the moving sidewalk lift 300 is kept on a roof of the vehicle body 100, and a rod rail 207 and a weight 209 are kept by being brought down within the vehicle body 100.

When the moving sidewalk lift 300 is moved up and down along the inclined surface, the driving motors 211a and 211b installed in the vehicle body 100 are automatically run. Accordingly, the rubber belt 700 of the moving sidewalk 200 is rotated such that the weight 209 is moved up or down along the rod rail 207 installed in horizontal and vertical directions. In turn, the cable 210 is rolled or unrolled and thereby the moving sidewalk 200 is activated, such that the moving sidewalk lift 300 can be located on the moving sidewalk plate 201. The moving sidewalk plate 201 forms the mattress 212, on which the compression springs 204 are horizontally disposed with a predetermined interval, on the bottom surface of the rubber belt 700. The moving sidewalk panels 213 supporting the mattress 212 are installed in a form of being horizontally disposed with a predetermined interval, thereby preventing the rubber belt 700 from being expanded.

Therefore, the foregoing detailed embodiments have been described to illustrate the technical idea of the present disclosure, but the present disclosure will not be limited to the same configuration and operations as those illustrated in the detailed embodiments, but different modification or variations may be practiced without departing apart from the scope of the present disclosure. Therefore, such modifications or variations should also be constructed as belonging to the scope of the present disclosure, and the scope of the disclosure is not to be limited by the above aspects but by the claims and the equivalents thereof.

What is claimed is:

1. An electric device for lifting a moving sidewalk for a vehicle, the device comprising:
    a rubber belt that is installed on a roof of a drivable vehicle body, the rubber belt forming an endless track;
    a moving sidewalk that has one end coupled to an edge of one side of the rubber belt, wherein the moving sidewalk extends by unfolding locker arms to form a chain rail from the rubber belt toward the ground, and is folded by folding the locker arms at the time of non-use;
    a moving sidewalk lift comprising a saw-toothed wheel installed on an upper portion of the chain rail, wherein the moving sidewalk lift is configured to load a luggage thereon, and allow the luggage to be fixed to an upper portion of the rubber belt by being moved along the rubber belt and the moving sidewalk in one direction;
    a driving unit comprising a cable coupled to a frame of the saw-tooth wheel and a motor configured to provide power to rotation of the rubber belt through the cable, wherein the driving unit is configured to provide a driving force for movement of the moving sidewalk lift; and
    a moving sidewalk robot that is configured to allow the saw-toothed wheel provided on the moving sidewalk lift to be horizontally balanced in an automatic manner while the saw-toothed wheel is moving along the chain rail upon the rotation of the rubber belt,
    wherein the locker arms are folded as the cable is rolled by the motor.

2. The device of claim 1, wherein the moving sidewalk lift comprises:
    the motor including a rotation motor that is configured to shift a direction; and
    at least one pulley and a moving sidewalk footboard that are configured to allow the moving sidewalk lift to move on the rubber belt.

3. The device of claim 1, wherein the moving sidewalk lift has, as a basic set, a lift roller wheel, wherein the lift roller wheel comprises:
    a pair of small roller wheels that are attached onto left and right sides of the moving sidewalk lift, respectively, based on a central fixing roller;
    left and right outer plate rollers that are provided adjacent to the pair of small roller wheels, respectively, to be moved based on a pair of fixing rollers; and
    small roller wheels that are attached onto left and right outer portions of the outer plate rollers, respectively,
    wherein the outer plate rollers are moved by the fixing roller, a pair of wheels and left and right wheels of the central fixing roller when the moving sidewalk lift is moved on the ground,
    wherein the outer plate rollers of the moving sidewalk lift are inserted into footboard grooves formed on the moving sidewalk footboard when the moving sidewalk lift is moved onto the moving sidewalk, and
    wherein at least one spring provided in the fixing roller is driven by the moving sidewalk lift's own weight so as to fix the lift roller wheel when the fixing roller of the lift is placed on a surface of the moving sidewalk footboard.

4. The device of claim 1, wherein the moving sidewalk robot comprises:
    a pair of left and right chain rail wheels that are attached onto an upper surface of the lift saw-toothed wheel, and configured to control the lift saw-toothed wheel to be horizontally balanced in an automatic manner, wherein the pair of left and right chain rails are balanced using the chain rail;
    a gyro sensor that is configured to measure an inclination of the moving sidewalk chain rail; and
    a controller and front and rear motors that are configured to control forward and backward movements of the lift saw-toothed wheel which runs on the chain rail,
    wherein the controller senses an inclined angle of the moving sidewalk robot using the gyro sensor, and recognizes whether the moving sidewalk robot is inclined forward or backward or located in place, such that the moving sidewalk robot is moved by a predetermined distance according to a line tracer sensor, installed on a space of an upper surface of the saw-toothed wheel of the moving sidewalk lift, and repetitively moved forward or backward toward an inclined side so as to maintain a horizontal state.

5. The device of claim 4, wherein the controller, which controls two wheels to be balanced when the lift saw-toothed wheel is located on the chain rail, the moving sidewalk robot which allows the lift saw-toothed wheel moving onto the chain rail to be balanced back and forth is connected based on the two wheels, and the lift saw-toothed wheel is located at a zero-point position, is configured to:
    calculate a current angle of the lift saw-toothed wheel using the gyro sensor;

compare the calculated current angle with a horizontal angle to determine whether the lift saw-toothed wheel is inclined forward or horizontally balanced;
output a control signal corresponding to a forwardly inclined angle when the lift saw-toothed wheel is inclined forward; and
output a control signal corresponding to a backwardly inclined angle when the lift saw-toothed wheel is inclined backwardly.

* * * * *